US011019461B2

(12) United States Patent
Kim et al.

(10) Patent No.: US 11,019,461 B2
(45) Date of Patent: May 25, 2021

(54) METHOD FOR PERFORMING OPERATION RELATED TO V2X MESSAGE TRANSMISSION IN WIRELESS COMMUNICATION SYSTEM, AND DEVICE THEREFOR

(71) Applicant: LG ELECTRONICS INC., Seoul (KR)

(72) Inventors: Laeyoung Kim, Seoul (KR); Jian Xu, Seoul (KR); Daewook Byun, Seoul (KR); Dongsoo Kim, Seoul (KR); Youngdae Lee, Seoul (KR); Jaewook Lee, Seoul (KR)

(73) Assignee: LG Electronics Inc., Seoul (KR)

(*) Notice: Subject to any disclaimer, the term of this patent is extended or adjusted under 35 U.S.C. 154(b) by 317 days.

(21) Appl. No.: 16/086,843

(22) PCT Filed: Mar. 24, 2017

(86) PCT No.: PCT/KR2017/003179
§ 371 (c)(1),
(2) Date: Sep. 20, 2018

(87) PCT Pub. No.: WO2017/164686
PCT Pub. Date: Sep. 28, 2017

(65) Prior Publication Data
US 2019/0104386 A1 Apr. 4, 2019

Related U.S. Application Data

(60) Provisional application No. 62/312,481, filed on Mar. 24, 2016.

(51) Int. Cl.
H04W 4/06 (2009.01)
H04W 76/00 (2018.01)
(Continued)

(52) U.S. Cl.
CPC ............... *H04W 4/06* (2013.01); *H04W 4/00* (2013.01); *H04W 4/40* (2018.02); *H04W 72/005* (2013.01);
(Continued)

(58) Field of Classification Search
CPC ................. G08G 1/162; G08G 1/0965; G08G 1/096716; H04L 12/189; H04L 67/12;
(Continued)

(56) References Cited

U.S. PATENT DOCUMENTS 9,992,730 B2 * 6/2018 Grzywacz ............... H04W 4/90
10,554,708 B2 * 2/2020 Wu .......................... H04W 4/06
(Continued)

FOREIGN PATENT DOCUMENTS

WO 2014046686 A1 3/2014
WO 2015142082 A1 9/2015

OTHER PUBLICATIONS

3GPP TS 23.468 V13.3.0, "Group Communication System Enablers for LTE (GCSE_LTE); Stage 2 (Release 13)", Dec. 15, 2015, pp. 7-8, 13, 17, 18.
(Continued)

*Primary Examiner* — Marsha D Banks Harold
*Assistant Examiner* — Dharmesh J Patel
(74) *Attorney, Agent, or Firm* — Dentons US LLP

(57) ABSTRACT

One embodiment of the present invention provides a method by which a network node performs an operation related to a vehicle to everything (V2X) message transmission to a user equipment (UE) in a wireless communication system, the method comprising the steps of: allowing the network node to receive a notify broadcast area message; allowing the network node to receive a V2X message after receiving the notify broadcast area message; and allowing the network node to determine a first eNB which will transmit the V2X
(Continued)

message to the UE, on the basis of the notify broadcast area message, without performing session update request procedures.

11 Claims, 11 Drawing Sheets

(51) Int. Cl.
    *H04W 4/00*        (2018.01)
    *H04W 76/11*      (2018.01)
    *H04W 4/40*        (2018.01)
    *H04W 72/00*      (2009.01)
    *H04W 8/00*        (2009.01)

(52) U.S. Cl.
    CPC ............ *H04W 76/00* (2013.01); *H04W 76/11* (2018.02); *H04W 8/005* (2013.01)

(58) Field of Classification Search
    CPC .......... H04W 4/00; H04W 4/06; H04W 4/40; H04W 4/44; H04W 72/005; H04W 76/00; H04W 76/02; H04W 76/11; H04W 76/40
    See application file for complete search history.

(56) References Cited

U.S. PATENT DOCUMENTS

| | | | |
|---|---|---|---|
| 2011/0021224 A1* | 1/2011 | Koskinen | H04W 72/005 455/507 |
| 2011/0305184 A1* | 12/2011 | Hsu | H04W 76/40 370/312 |
| 2012/0172028 A1* | 7/2012 | Korus | H04W 60/00 455/422.1 |
| 2012/0307707 A1 | 12/2012 | Wang | |
| 2016/0080163 A1* | 3/2016 | Taylor | H04L 51/20 370/312 |

OTHER PUBLICATIONS

Qualcomm, et al.: "V2X reference architecture and RSU discussion", S2-160512, 3GPP TSG RAN WG2 Meeting #113, Saint Kitts, KN, Jan. 25-29, 2016.

3GPP TS 29.468 V13.1.0, "Group Communication System Enablers for LTE (GCSE_LTE); Stage 3 (Release 13)", Mar. 18, 2016, pp. 7-8, 10, 11, 29, 30.

Bibmeyer, et al.: "PREparing SEcuRe VEhicle-to-X Communication Systems: V2X Security Architecture v2 , (Deliverable 1.3)", Project: Preserve, No. IST-269994, Part of the Seventh Framework Program Funded by the EC-DG INFSO, Jan. 31, 2014.

* cited by examiner

METHOD FOR PERFORMING OPERATION RELATED TO V2X MESSAGE TRANSMISSION IN WIRELESS COMMUNICATION SYSTEM, AND DEVICE THEREFOR

This application is a 35 use § 371 national stage entry of international application no. PCT/KR2017/003179 filed on Mar. 24, 2017, and claims priority to U.S. provisional application No. 62/312,481 filed on Mar. 24, 2016, all of which are hereby incorporated by reference in their entireties as if fully set forth herein.

TECHNICAL FIELD

The present invention relates to a wireless communication system, and more particularly, to a method by which a network node performs operations related to vehicle to everything (V2X) message transmission associated with a broadcast area for V2X services and device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly without an evolved Node B (eNB). D2D communication may cover UE-to-UE communication and peer-to-peer communication. In addition, D2D communication may be applied to Machine-to-Machine (M2M) communication and Machine Type Communication (MTC).

D2D communication is under consideration as a solution to the overhead of an eNB caused by rapidly increasing data traffic. For example, since devices exchange data directly with each other without an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

Currently, discussion on V2X communication associated with D2D communication is in progress. The V2X communication corresponds to a concept including V2V communication performed between vehicle UEs, V2P communication performed between a vehicle and a UE of a different type, and V2I communication performed between a vehicle and an RSU (roadside unit).

DISCLOSURE OF THE INVENTION

Technical Task

The technical task of the present invention is to provide how a network node operates upon receiving a Notify Broadcast Area message.

It will be appreciated by persons skilled in the art that the objects that could be achieved with the present disclosure are not limited to what has been particularly described hereinabove and other objects that the present disclosure could achieve will be more clearly understood from the following detailed description.

Technical Solution

In an aspect of the present invention, provided is a method of performing operations related to Vehicle to Everything (V2X) message transmission to a User Equipment (UE) by a network node in a wireless communication system. The method may include: receiving, by the network node, a Notify Broadcast Area message; and receiving, by the network node, a V2X message after receiving the Notify Broadcast Area message. In this case, the network node may determine a first evolved Node B (eNB) that will transmit the V2X message to the UE based on the Notify Broadcast Area message without performing a session update request procedure.

In another aspect of the present invention, provided is a network node for performing operations related to Vehicle to Everything (V2X) message transmission to a User Equipment (UE) in a wireless communication system. The network node may include: a transceiver; and a processor. In this case, the processor may be configured to receive a Notify Broadcast Area message through the transceiver, receive a V2X message through the transceiver after receiving the Notify Broadcast Area message, and determine a first evolved Node B (eNB) that will transmit the V2X message to the UE based on the Notify Broadcast Area message without performing a session update request procedure.

The network node that receives the Notify Broadcast Area message may be unrelated to a broadcast area indicated by the Notify Broadcast Area message.

If a broadcast area for the V2X message transmission determined by a V2X Application Server (AS) is different from that of a Multimedia Broadcast Multicast Service (MBMS) bearer, the Notify Broadcast Area message may correspond to a message transmitted from the V2X AS.

The MBMS bearer may be established before the V2X AS determines the broadcast area.

The network node may be a MBMS gateway (GW).

The MBMS GW may not change the broadcast area of the MBMS bearer.

The MBMS GW may drop V2X message transmission to an eNB which does not belong to the broadcast area indicated by the Notify Broadcast Area message.

The network node may be a second eNB.

If the second eNB is not equivalent to the first eNB that will transmit the V2X message, the second eNB may delete the V2X message.

The Notify Broadcast Area message may include at least one of a Temporary Mobile Group Identity (TMGI), a FlowID, and an MBMS broadcast area parameter.

The MBMS broadcast area parameter may include either or both a list of MBMS service area identities and a list of cell IDs.

Advantageous Effects

In an aspect of the present invention, provided is a method of performing operations related to Vehicle to Everything (V2X) message transmission to a User Equipment (UE) by a network node in a wireless communication system. The method may include: receiving, by the network node, a Notify Broadcast Area message; and receiving, by the network node, a V2X message after receiving the Notify Broadcast Area message. In this case, the network node may determine a first evolved Node B (eNB) that will transmit the V2X message to the UE based on the Notify Broadcast Area message without performing a session update request procedure.

In another aspect of the present invention, provided is a network node for performing operations related to Vehicle to Everything (V2X) message transmission to a User Equipment (UE) in a wireless communication system. The network node may include: a transceiver; and a processor. In this case, the processor may be configured to receive a Notify Broadcast Area message through the transceiver, receive a V2X message through the transceiver after receiving the Notify Broadcast Area message, and determine a first evolved Node B (eNB) that will transmit the V2X message to the UE based on the Notify Broadcast Area message without performing a session update request procedure.

The network node that receives the Notify Broadcast Area message may be unrelated to a broadcast area indicated by the Notify Broadcast Area message.

If a broadcast area for the V2X message transmission determined by a V2X Application Server (AS) is different from that of a Multimedia Broadcast Multicast Service (MBMS) bearer, the Notify Broadcast Area message may correspond to a message transmitted from the V2X AS.

The MBMS bearer may be established before the V2X AS determines the broadcast area.

The network node may be a MBMS gateway (GW).

The MBMS GW may not change the broadcast area of the MBMS bearer.

The MBMS GW may drop V2X message transmission to an eNB which does not belong to the broadcast area indicated by the Notify Broadcast Area message.

The network node may be a second eNB.

If the second eNB is not equivalent to the first eNB that will transmit the V2X message, the second eNB may delete the V2X message.

The Notify Broadcast Area message may include at least one of a Temporary Mobile Group Identity (TMGI), a FlowID, and an MBMS broadcast area parameter.

The MBMS broadcast area parameter may include either or both a list of MBMS service area identities and a list of cell IDs.

It will be appreciated by those skilled in the art that the effects that can be achieved through the embodiments of the present disclosure are not limited to those described above and other advantages of the present disclosure will be more clearly understood from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE FOR INVENTION

Figure 1:
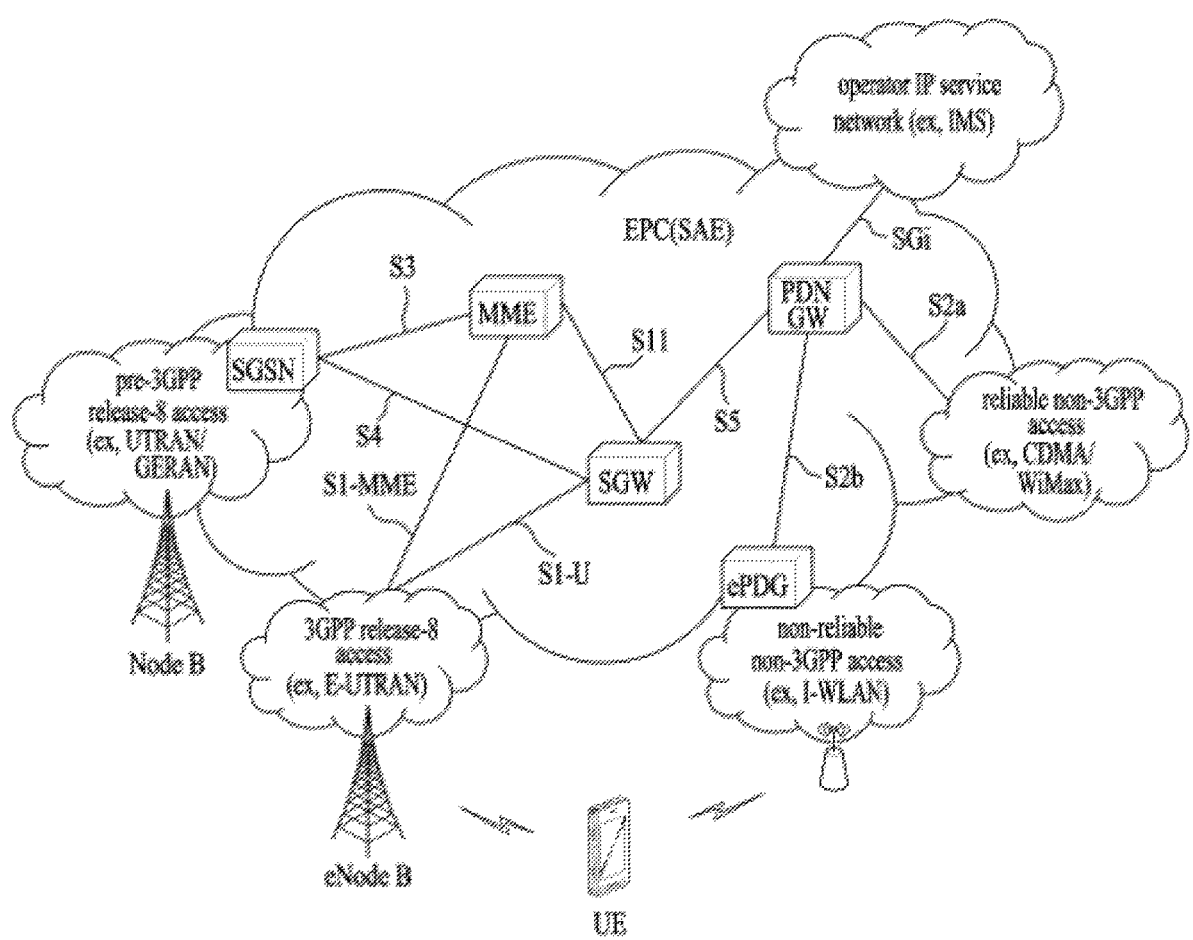
FIG. 1 is a diagram showing a schematic structure of an evolved packet system (EPS) including an evolved packet core (EPC).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
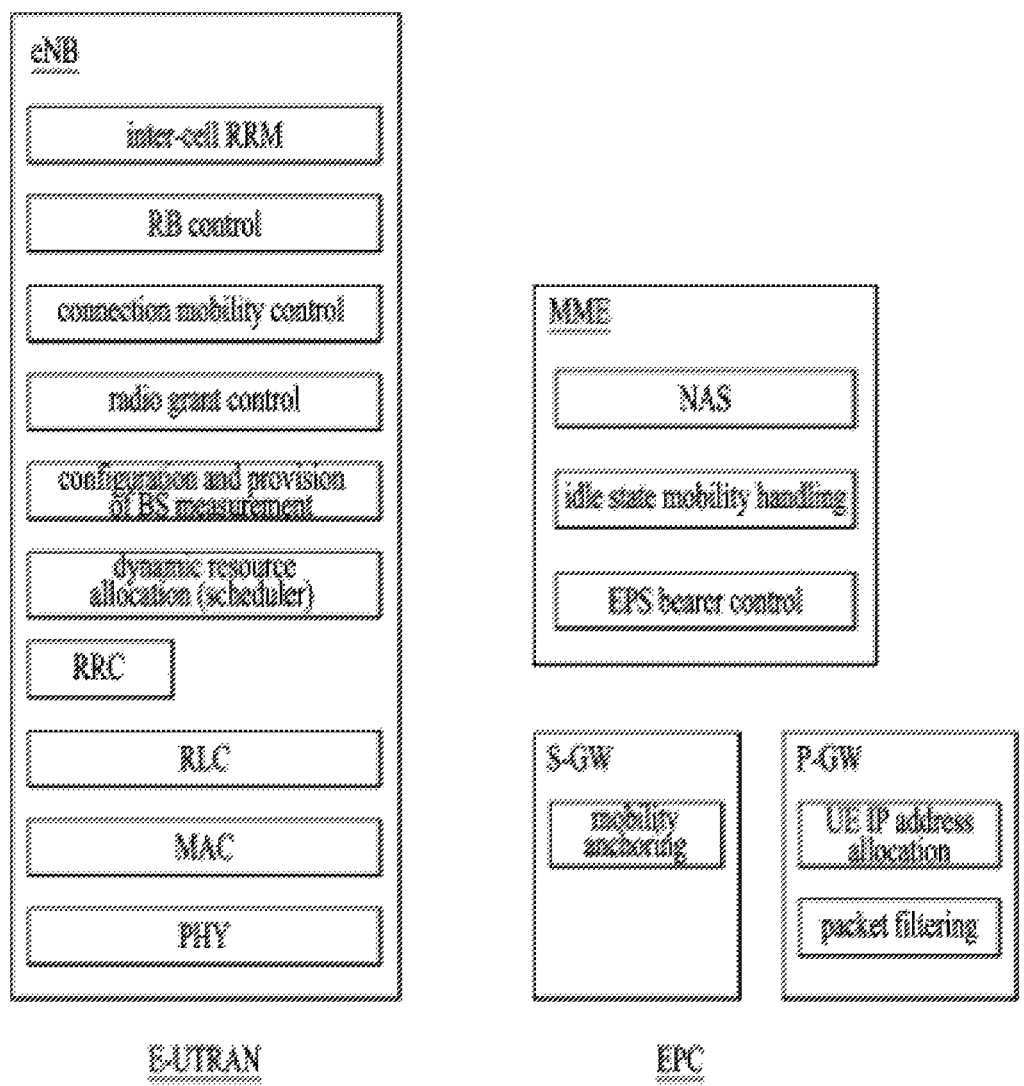
FIG. 2 is an exemplary diagram illustrating an architecture of a general E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
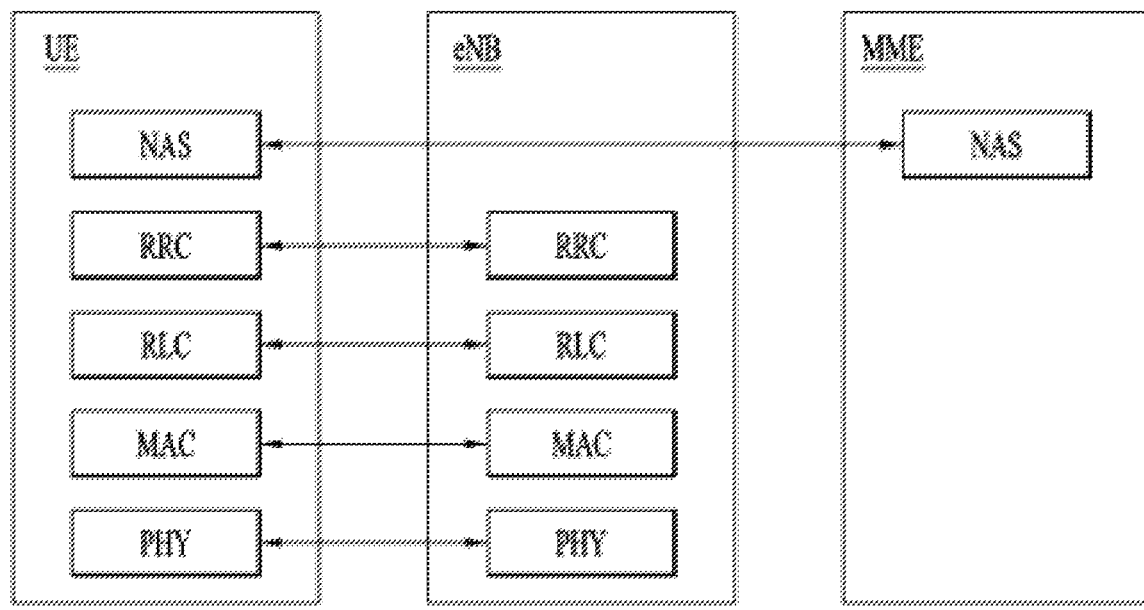
FIG. 3 is an exemplary diagram illustrating a structure of a wireless interface protocol in a control plane.
Figure 4:
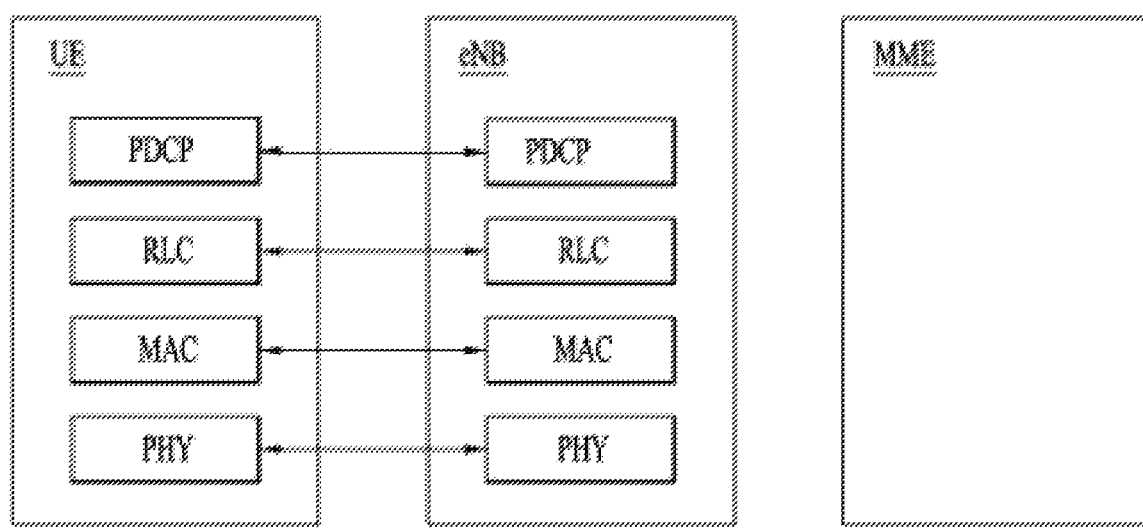
FIG. 4 is an exemplary diagram illustrating a structure of a wireless interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This $_1$D is called an EPS bearer ID. One EPS bearer has QoS characteristics of a maximum bit rate (MBR) and/or a guaranteed bit rate (GBR).

Figure 5:
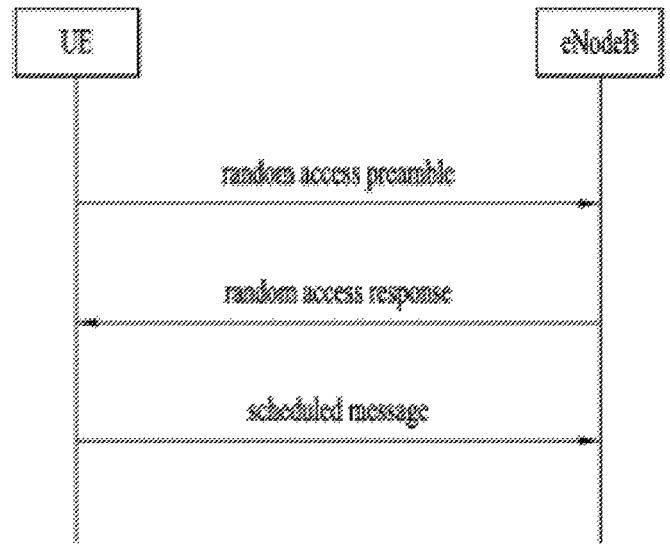
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
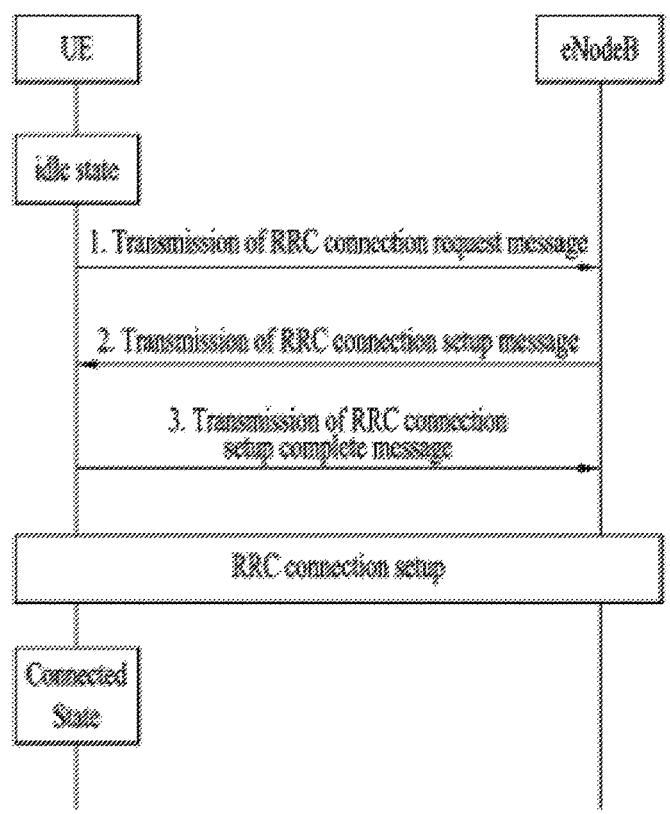
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
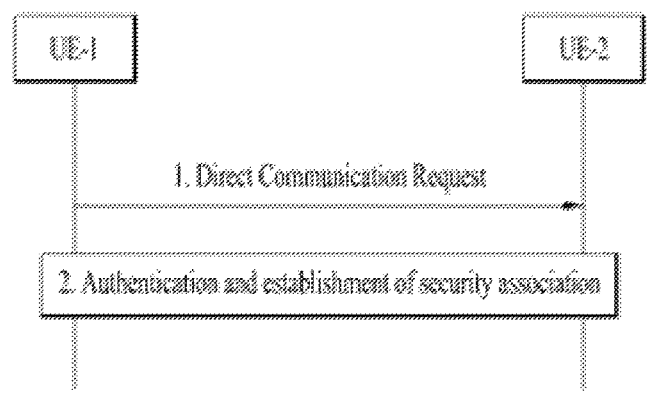
FIG. 7 illustrates a procedure for establishing a 1:1 connection between UEs.

FIG. 7 illustrates a procedure for establishing a 1:1 connection between UEs. After establishing a 1:1 connection through the procedure shown in FIG. 7, a UE can transmit and receive V2X messages over a PC5 interface (D2D interface or sidelink at the physical layer). The detail of the above procedure can be found in section 5.4.5.2 (Establishment of secure layer-2 link over PC5) of TS 23.303. The V2X message transmission through a 1:1 PC5 interface connection can be used not only when UEs transmit and receive V2X messages but also when a UE exchanges V2X messages with a UE-type RSU. In general, the V2X message transmission and reception may be performed on the basis of 1:many broadcast as well as the 1:1 PC5 interface connection. More details can be found in TS 23.285.

Figure 8:
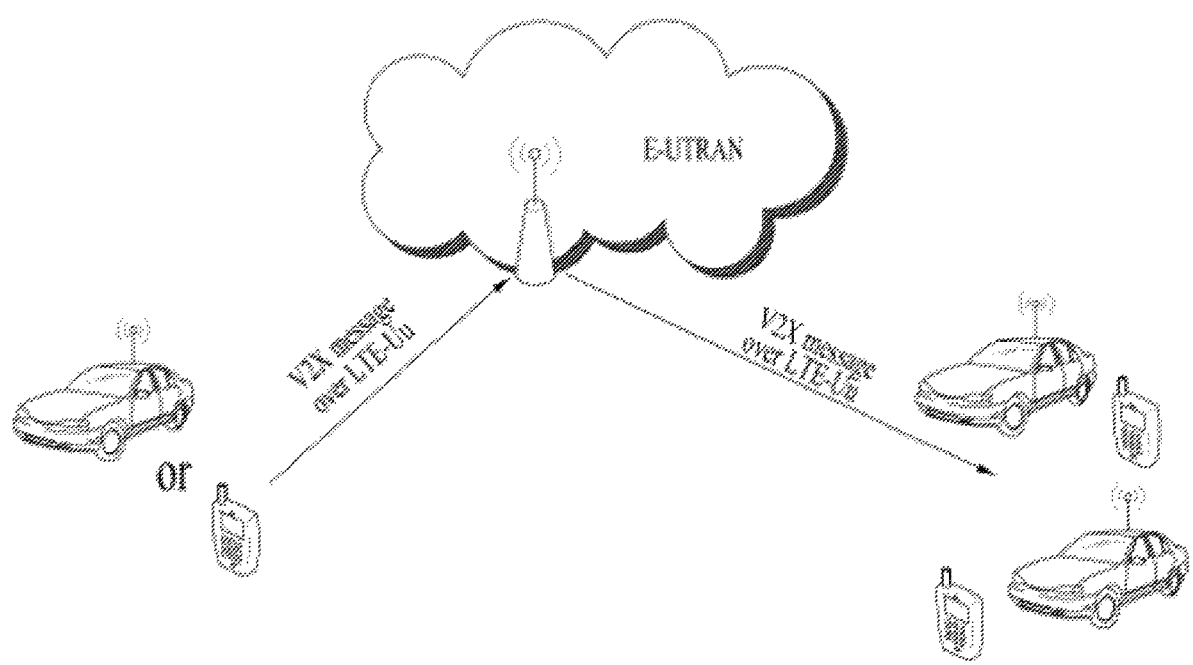
FIG. 8 illustrates an example of V2X messages transmission and reception over an LTE-Uu interface.
Figure 9:
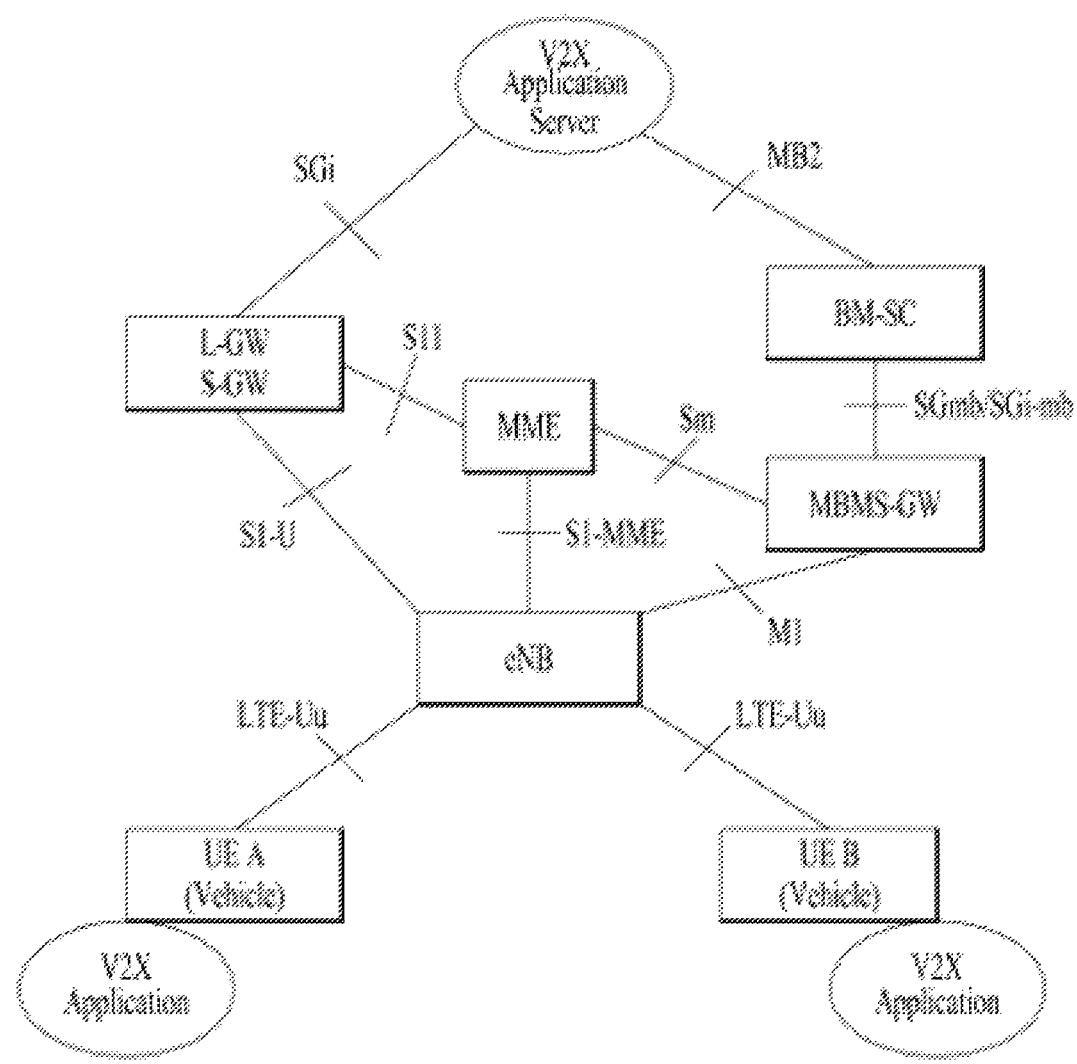
FIG. 9 illustrates Selected IP Traffic Offload at Local Network (SIPTO@LN) for local routing of V2X messages and a local MBMS architecture.

In addition, as one V2X message transmission and reception method, V2X message transmission and reception can be performed based on LTE-Uu interface as well as over a PC5 interface between UEs. FIG. 8 illustrates an example of V2X messages transmission and reception over an LTE-Uu interface. Referring to FIG. 8, it can be seen that when a UE transmits a V2X message over the LTE-Uu interface, the V2X message is delivered to a plurality of UEs. In this case, the local routing of the V2X message may be considered to reduce delay in the V2X message transmission and reception. To this end, Selected IP Traffic Offload at Local Network (SIPTO@LN), which is defined in 3GPP TS 23.401, can be considered. FIG. 9 illustrates SIPTO@LN for local routing of V2X messages and a local MBMS architecture. Referring to FIG. 9, a core network entity and a V2X application server are located close to an access network to reduce delay.

Figure 10:
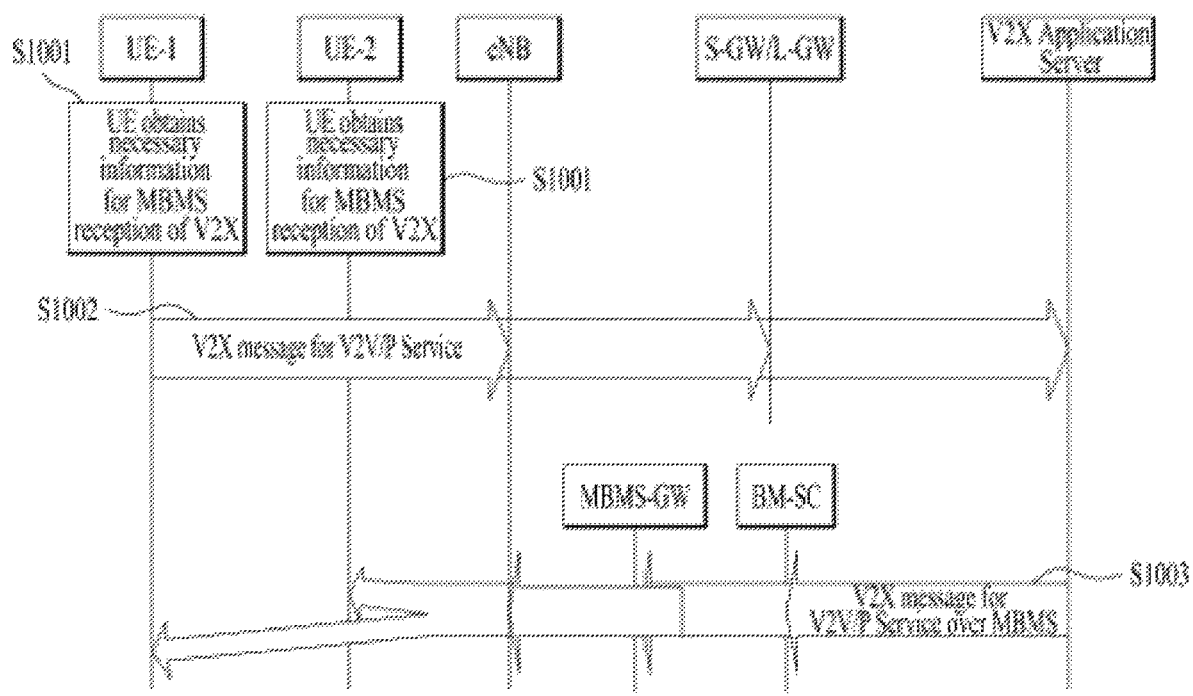
FIG. 10 illustrates a procedure for transmitting and receiving V2X messages over an LTE-Uu interface.

FIG. 10 illustrates a procedure for transmitting and receiving V2X messages over an LTE-Uu interface. Referring to FIG. 10, in step S1001, UEs obtain necessary information for MBMS reception of V2X messages for V2V/P services. In step S1002, UE-1 transmits a V2X message over the LTE-Uu interface. In this case, UE-1 has already established SIPTO at a local network PDN connection to transmit the V2X message for the V2V/P services over the LTE-Uu interface as described in TS 23.401. Upon receiving the V2X message, the eNB routes the V2X message to the application server via the S-GW/L-GW. In step S1003, the V2X application server determines to forward the V2X message and the target area of the message. The V2X application server transmits the V2X message to the target area of the message by MBMS delivery. The MBMS bearer used for the MBMS delivery can be pre-established. In the following description, a local network could be interpreted as a local network for V2X services, a local network for local routing of V2X message, or the like.

If a UE transmits a V2X message via LTE-Uu in uplink as shown in the example of FIG. 10, the V2X message is delivered to a V2X Application Server (AS). Then, the V2X AS analyzes the V2X message (for example, at application layers) and then determines a region/area where the V2X message will be broadcast. For example, referring to ETSI TS 102 894-2 V1.2.1, a V2X message may include distance information on how far the V2X message travels as shown in Table 2 below.

TABLE 2

| | |
|---|---|
| Descriptive Name | RelevanceDistance |
| Identifier | DataType_61 |
| ASN.1 representation | RelevanceDistance ::= ENUMERATED {lessThan50m(0), lessThan100m(1), lessThan200m(2), lessThan500m(3), lessThan1000m(4), lessThan5km(5), lessThan10km(6), over10km(7)} |
| Definition | DE describing a distance of relevance for information indicated in a message, for example, it may be used to describe the distance of relevance of an event indicated in a DENM as defined in ETSI EN 302 637-3 [i.3]. |
| Unit | N/A |
| Category | GeoReference information |

Since the V2X message includes information of the location of a UE that transmits the V2X message as shown in Table 2, the V2X AS can determine the region/area/range/distance where the received V2X message will be broadcast.

In addition, in some cases, the V2X AS may autonomously create a V2X message and then transmit the V2X message. In this case, the V2X AS can also determine the region/area/range/distance where the received V2X message will be broadcast. In order to broadcast a V2X message, the V2X AS should perform a procedure for allocating resources for an MBMS bearer. Details can be found in section 5.1.2.3.2 (Activate MBMS Bearer Procedure) of TS 23.468 and section 8.3.2 (MBMS Session Start Procedure for E-UTRAN and UTRAN for EPS) of TS 23.246. To satisfy the latency requirements shown in Table 3 below, which are defined in TS 22.185, with respect to MBMS bearer setup, in particular, V2X message transmission, MBMS bearers can be pre-established and used. In other words, if there is no V2X message to be transmitted, an MBMS bearer can be activated. Details of the procedure in which a V2X AS configures MBMS bearers can be found in TS 23.468 and TS 23.246.

TABLE 3

| | |
|---|---|
| [R-5.2.1-001] | The E-UTRA(N) shall be capable of transferring messages between two UEs supporting V2V/P application, directly or via an RSU, with a maximum latency of 100 ms. |
| [R-5.2.1-002] | For particular usage (i.e., pre-crash sensing) only, the E-UTRA(N) should be capable of transferring messages between two UEs supporting V2V application with a maximum latency of 20 ms. |
| [R-5.2.1-003] | The E-UTRA(N) shall be capable of transferring messages between a UE supporting V2I application and an RSU with a maximum latency of 100 ms. |
| [R-5.2.1-004] | The E-UTRAN shall be capable of transferring messages via 3GPP network entities between a UE and an application server both supporting V2N application with an end-to-end delay no longer than 1000 ms. |
| [R-5.2.1-005] | The E-UTRA(N) shall be able to support high reliability without requiring application-layer message retransmissions. |

As described above, when a V2X AS transmits a V2X message in a broadcast manner, the V2X AS can determine a broadcast area. In this case, the broadcast area can be determined based on the type/characteristics of the V2X message and/or the location of a UE that transmits the V2X message and/or a relevance distance (or destined area). In other words, the area in which the V2X message is broadcast may vary depending on the V2X message.

Figure 11:
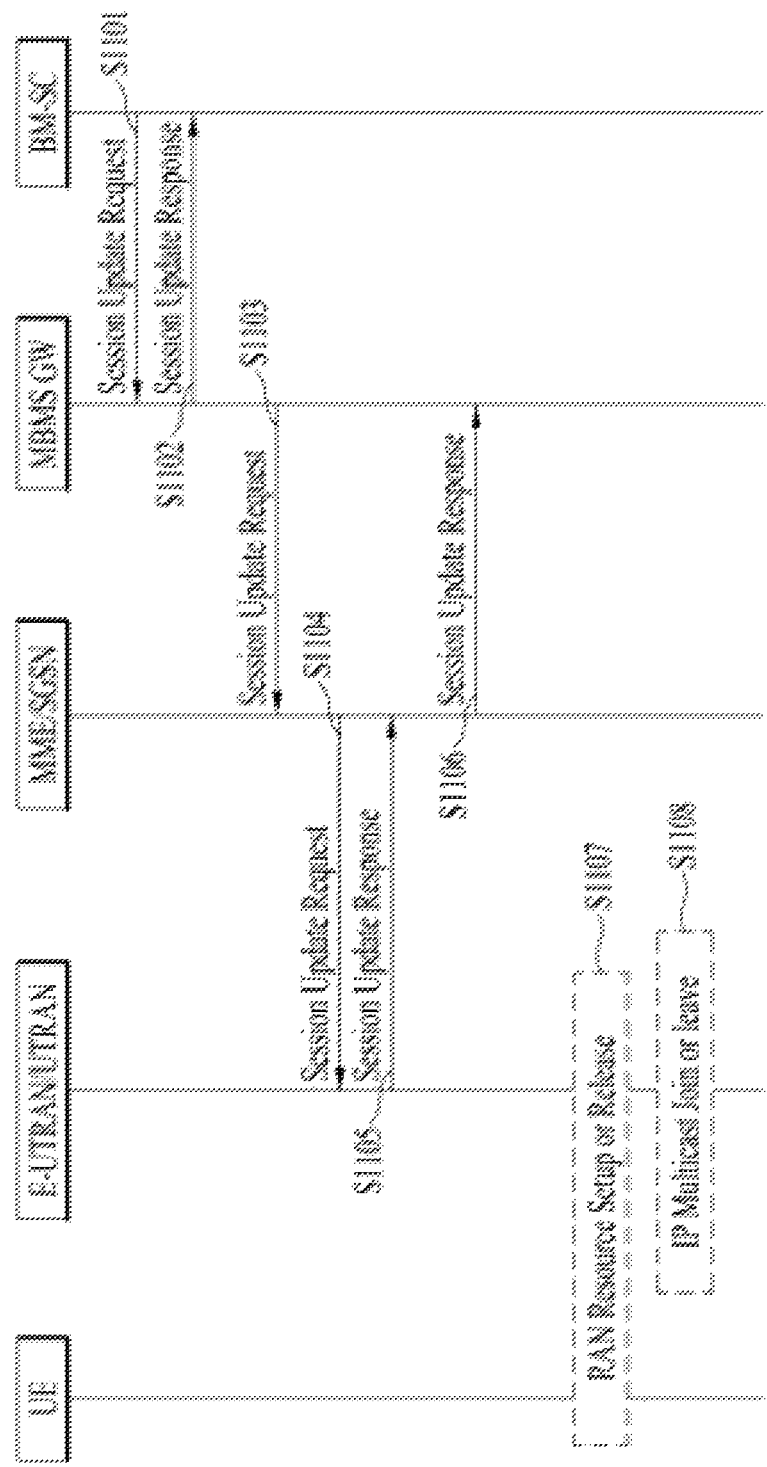
FIG. 11 illustrates a procedure for changing a broadcast area.

To change the broadcast area of an MBMS bearer, the Modify MBMS Bearer procedure defined in section 5.1.2.4 of TS 23.468 can be performed. In this procedure, the operations between an AS and a BM-SC are described. In addition, the details of the procedure between a BM-SC (hereinafter referred to as an MBMS-related node) and a UE shown in FIG. 11 can be found in section 8.8.4 (BM-SC initiated Session Update for EPS with E-UTRAN and UTRAN) of TS 23.246. Thus, the details of FIG. 11 is omitted in this document.

When the broadcast area is changed according to the Modify MBMS Bearer procedure, messages can be exchanged as shown in the figures of section 8.8.4 of TS 23.246. In particular, when the broadcast area is changed, an MBMS GW sends a Session Start request to an newly added MME, sends a Session Stop request to an MME to be removed, and sends a Session Update request to a remaining MME. In addition, an MCE/eNB should perform relevant operation. In other words, since the Modify MBMS Bearer procedure requires a certain amount of time to transmit actual contents, that is, a V2X message, it is difficult to satisfy the latency requirements of the V2X message transmission. Therefore, the present invention proposes embodiments capable of not only solving the latency problems but broadcasting V2X messages in a suitable area.

EMBODIMENT

According to an embodiment of the present invention, a network node can receive a Notify Broadcast Area message and then receive a V2X message. In this case, the network node may determine a first eNB that will transmit the V2X message to a UE based on the Notify Broadcast Area message without performing a session update request procedure (for updating a broadcast area). Here, the network node that receives the Notify Broadcast Area message may be unrelated to the broadcast area indicated by the Notify Broadcast Area message.

Specifically, the network node that receives the Notify Broadcast Area message may include network nodes related to a pre-established MBMS bearer, which will be described later, whereas the broadcast area indicated by the Notify Broadcast Area message may affect the network nodes that will receive the V2X message only.

The network node may be an MBMS GW or an eNB. When the network node is an MBMS GW, the MBMS GW does not transmits the V2X message to the eNB that is not included in the broadcast area indicated by the Notify Broadcast Area message. On the other hand, when the network node is an eNB (hereinafter such an eNB is referred to as a second eNB to distinguish it with the aforementioned first eNB). When the second eNB is not the first eNB that will transmits the V2X message, the V2X message is deleted.

In other words, the eNB that will transmits the V2X message is determined/selected based on the broadcast area indicated by the Notify Broadcast Area message without changing the broadcast area for the existing MBMS bearer. According to this configuration, even if the broadcast area varies per V2X message or per UE, it is possible to rapidly adjust the broadcast area where the V2X message is broadcast without changing the MBMS bearer to change the broadcast area In the above description, if the broadcast area for the V2X message transmission determined by a V2X Application Server (AS) is different from that of the MBMS bearer, the Notify Broadcast Area message may be a message transmitted from the V2X AS. In addition, the MBMS bearer may be established before the V2X AS determines the broadcast area. The broadcast area for the MBMS bearer can be set in a wide area, for example, an area which covers one or more local networks described in Solution #3 of TR 23.785, an MBMS service area, an MBSFN area, etc.

The Notify Broadcast Area message may include at least one of a Temporary Mobile Group Identity (TMGI), a FlowID, and an MBMS broadcast area parameter. In this case, the MBMS broadcast area parameter may include at least one of a list of MBMS service area identities and a list of cell IDs.

Hereinafter, a case (embodiment 1) in which the above-described network node is an eNB and a case (embodiment 2) in which the above-described network node is an MBMS GW will be described in detail with reference to FIGS. 12 and 13.

Embodiment 1

Figure 12:
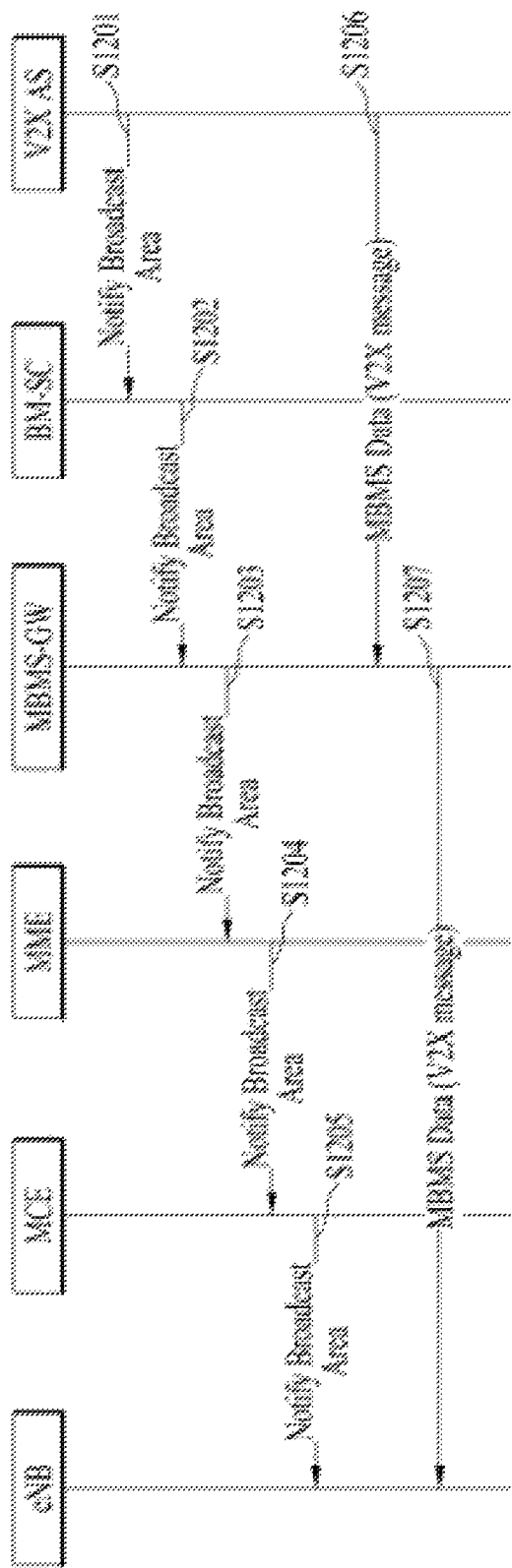
FIGS. 12 and 13 are diagrams for explaining the embodiments of the present invention.

FIG. 12 illustrates the operations of individual network nodes when the aforementioned network node is an eNB.

Referring to FIG. 12, the V2X AS determines the broadcast area of a V2X message based on information in the V2X message in step S1201.

In this case, since the broadcast area of the V2X message is different from that of an established/activated MBMS bearer, the broadcast area of the established/activated MBMS bearer should be notified. If the V2X AS determines that the broadcast area of the activated MBMS bearer should be modified/notified, the V2X AS transmits a Notify Broadcast Area message including at least one of a TMGI, a FlowID, and an MBMS parameter to the BM-SC. The MBMS broadcast area parameter should include a list of MBMS service area identities or a list of cell IDs or all of them. The Notify Broadcast Area message informs the eNB(s) involved in the activated MBMS bearer of an area where upcoming MBMS data needs to be transmitted, and this area is included in a Broadcast Area Notify message (Notify Broadcast Area message) as the MBMS broadcast area parameter. This information can be explicitly included in the Notify Broadcast Area message or implicitly transmitted. In addition, this information can be a combination of various information. The Notify Broadcast Area message may be a newly defined message or an existing message extended to indicate modifications (for example, the existing message indicates the modified broadcast area).

As shown in FIG. 12, the Notify Broadcast Area message is delivered to the eNB in steps S1202 to S1205. The BM-SC, MBMS GW, MME and MCE do not change the original broadcast area of the MBMS bearer, and this means that they keep the broadcast area determined when the MBMS bearer was activated. When the BM-SC, MBMS GW, MME and MCE forward the Notify Broadcast Area message, a downstream node (i.e., a node(s) for forwarding the V2X message) is determined based on the original broadcast area of the MBMS bearer.

In steps S1204 and S1205, the broadcast area of the V2X message is included in the MBMS session update request procedure or a newly defined procedure, for example, the Notify Broadcast Area message shown in FIG. 12. Upon receiving location information, the MCE forwards the location information to the original eNB without any changes when a session is initially set up. When receiving the location information, the eNB should check a new Information Element (IE) to handle a subsequent packet. The new IE may indicate that the session update is to notify the broadcast area of the upcoming MBMS data. If a newly defined procedure is used, such information/indication may be included in a message or implicitly transmitted. The eNB can always skip the action of 'joining or leaving from IP multicast' in order to keep the original broadcast area active.

In step S1206, the V2X AS transmits the V2X message. The V2X AS may perform the V2X message transmission after receiving a response message from the BM-SC or without receiving any response messages.

In step S1207, the eNB receives the V2X message from the MBMS GW. The eNB performs V2X message transmission based on the notified broadcast area. Therefore, the eNB does not transmit the V2X message to the area or cell which is not belong to the notified broadcast area. If there is no area/cell to which the eNB transmits the V2X message, the eNB discards the V2X message. The eNB may use an MBSFN scheme or an SC-PTM scheme when transmitting the V2X message.

In FIG. 12, it is not depicted that each network node transmits a response message to an upstream node after receiving the Notify Broadcast Area message from the upstream node. In this case, each network node may transmit the response message immediately after receiving the Notify Broadcast Area message or after receiving a response message from its downstream node.

For the V2X message transmission, one same message may be transmitted multiple times. When there is no V2X message to be broadcast to the notified broadcast area, the V2X AS can explicitly inform the BM-SC that the broadcast area of the MBMS bearer is changed back, and such a message can be transmitted to downstream nodes.

Embodiment 2

Figure 13:
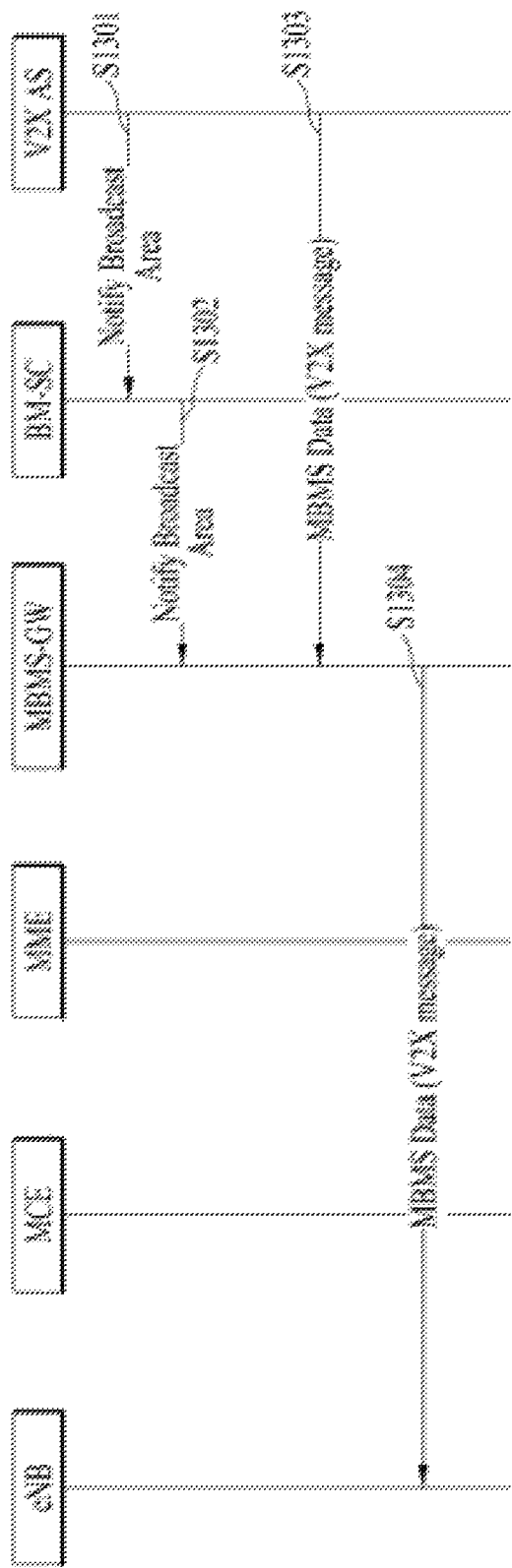

Referring to FIG. 13, the V2X AS determines the broadcast area of a V2X message based on information in the V2X message in step S1301. Since step S1301 is the same as step S1201 of embodiment 1, details will be omitted.

In step S1302, the BM-SC transmits a Notify Broadcast Area message to the MBMS GW. The BM-SC and MBMS GW do not change the original broadcast area of the MBMS bearer, and this means that they decide to keep the broadcast area determined when the MBMS bearer was activated. When the BM-SC forwards the Notify Broadcast Area message, downstream nodes are determined based on the original broadcast area of the MBMS bearer.

In step S1303, the V2X AS transmits the V2X message. The V2X AS may perform the V2X message transmission after receiving a response message from the BM-SC or without receiving any response messages. The MBMS GW receives the V2X message. The MBMS GW performs V2X message transmission based on the notified broadcast area. Therefore, the MBMS GW does not transmit the V2X message to the eNB whose area or cell do not belong to the notified broadcast area. To this end, the MBMS GW may perform selection of an eNB(s) that the V2X message needs to be transmitted to. In this case, an IGMP protocol may need to be changed for the MBMS GW to broadcast the V2X message to only an IP multicast group rather than all eNBs that join the MBMS bearer.

In FIG. 13, it is not depicted that each network node transmits a response message to an upstream node after receiving the Notify Broadcast Area message from the upstream node. In this case, each network node may transmit the response message immediately after receiving the Notify Broadcast Area message or after receiving a response message from its downstream node.

For the V2X message transmission, one same message may be transmitted multiple times. When there is no V2X message to be broadcast to the notified broadcast area, the V2X AS can explicitly inform the BM-SC that the broadcast area of the MBMS bearer is changed back, and such a message can be transmitted to the MBMS GW.

It is illustrated in FIGS. 12 and 13 that MBMS data is directly transmitted from the V2X AS to the MBMS GW. This means that it is assumed that the user plane part of the MBMS GW is directly connected to the V2X data for fast MBMS data transmission. However, unlike this, the V2X AS can transmit the MBMS data to the BM-SC, and the BM-SC can forward the MBMS data to the MBMS GW. The MBM data can mean not only V2X messages but also various contents/data for V2X services.

Although the above-described embodiments are proposed to support V2X services, the embodiments can also be applied to more general cases, for example, to reduce broadcast transmission latency. In this case, the AS may be a different AS (that is, an AS related to services to be provided), and the data transmitted through the MBMS bearer may be data related to the corresponding services other than the V2X message.

Figure 14:
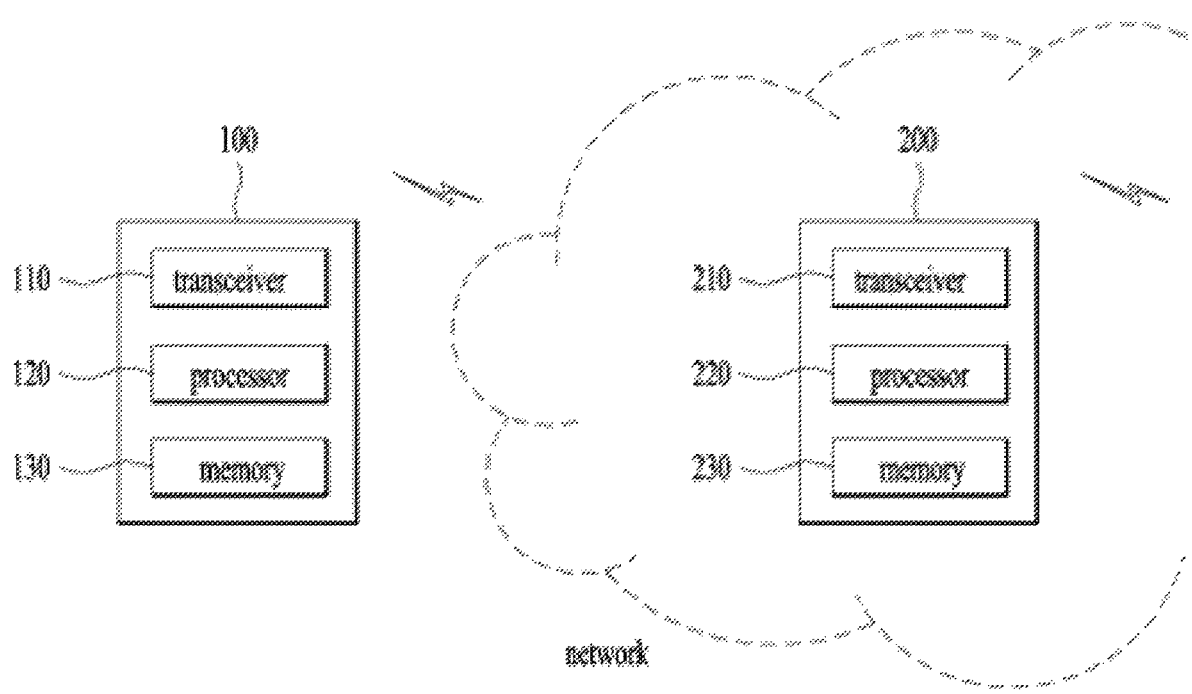
FIG. 14 is a diagram illustrating the configurations of a UE and a network node according to preferred embodiments of the present invention.

FIG. 14 is a diagram illustrating the configurations of a UE and a network node according to a preferred embodiment of the present invention.

Referring to FIG. 14, a UE 100 according to the present invention may include a transceiver 110, a processor 120, and a memory 130. The transceiver 110 may be configured to transmit and receive various signals, data, and information to and from an external device. The UE 100 may be connected to the external device by wire and/or wirelessly. The processor 120 may be configured to control the overall operations of the UE 100 and perform a function of processing information to be exchanged between the UE 100 and external device. The memory 130 may be configured to store the processed information during a predetermined time, and it can be replaced with a component such as a buffer (not shown in the drawing). Moreover, the processor 120 may be configured to perform the UE operations proposed in the present invention.

Referring again to FIG. 14, a network node 200 may include a transceiver 210, a processor 220, and a memory 230. The transceiver 210 may be configured to transmit and receive various signals, data, and information to and from an external device. The network node 200 may be connected to the external device by wire and/or wirelessly. The processor 220 may be configured to control the overall operations of the network node 200 and perform a function of processing information to be exchanged between the network node 200 and external device. The memory 230 may be configured to store the processed information during a predetermined time, and it can be replaced with a component such as a buffer (not shown in the drawing). Moreover, the processor 120 may be configured to perform the network node operations proposed in the present invention. Specifically, the processor 120 may be configured to control the transceiver to receive a Notify Broadcast Area message and receive a V2X message after receiving the Notify Broadcast Area message. In addition, based on the Notify Broadcast Area message, the processor 120 may be configured to determine a first eNB that will transmit the V2X message to a UE without performing a session update request procedure.

For configuration of the UE 100 and the network apparatus, the details described in various embodiments of the present invention may be independently applied or implemented such that two or more embodiments are simultaneously applied. For simplicity, redundant description is omitted.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, and the like.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit and scope of the invention disclosed in the appended claims. Thus, the present invention is not intended to be limited to the embodiments described herein, but is intended to accord with the widest scope corresponding to the principles and novel features disclosed herein.

INDUSTRIAL APPLICABILITY

Although embodiments of the present invention have been described above focusing on the 3GPP system, they are applicable to various mobile communication systems in the same manner.

What is claimed is:

1. A method of performing operations related to Vehicle to Everything (V2X) message transmission to a User Equipment (UE) by a network node in a wireless communication system, the method comprising:
receiving, by the network node, a Notify Broadcast Area message informing the network node of a first broadcast area of a V2X message; and
receiving, by the network node, a V2X message after receiving the Notify Broadcast Area message, wherein the network node is related to a Multimedia Broadcast Multicast Service (MBMS) bearer for a second broadcast area,
wherein the network node determines a first base station that will transmit the V2X message to the UE based on the Notify Broadcast Area message without updating the second broadcast area related to the MBMS bearer.

2. The method of claim 1, wherein based on a broadcast area for the V2X message transmission being determined, by a V2X Application Server (AS), to be different from the second broadcast area related to the MBMS bearer, the Notify Broadcast Area message is transmitted from the V2X AS.

3. The method of claim 2, wherein the MBMS bearer is established before the V2X AS determines whether the broadcast area is different from the second broadcast area related to the MBMS bearer.

4. The method of claim 1, wherein the network node is a MBMS gateway (GW).

5. The method of claim 4, wherein the MBMS GW does not change a broadcast area of an MBMS bearer.

6. The method of claim 4, wherein the MBMS GW drops V2X message transmission to a base station which does not belong to a broadcast area indicated by the Notify Broadcast Area message.

7. The method of claim 1, wherein the network node is a second base station.

8. The method of claim 7, wherein based on the second base station being different than the first base station, which transmits the V2X message, the second base station deletes the V2X message.

9. The method of claim 1, wherein the Notify Broadcast Area message includes at least one of a Temporary Mobile Group Identity (TMGI), a FlowID, and a MBMS broadcast area parameter.

10. The method of claim 9, wherein the MBMS broadcast area parameter includes either or both a list of MBMS service area identities and a list of cell IDs.

11. A network node for performing operations related to Vehicle to Everything (V2X) message transmission to a User Equipment (UE) in a wireless communication system, the network node comprising:
   a transceiver; and
   a processor,
   wherein the processor is configured to receive a Notify Broadcast Area message through the transceiver informing the processor of a first broadcast area for a V2X message, and receive a V2X message through the transceiver after receiving the Notify Broadcast Area message, wherein the network node is related to a Multimedia Broadcast Multicast Service (MBMS) bearer for a second broadcast area, and
   wherein a first base station that will transmit the V2X message to the UE based on the Notify Broadcast Area message is determined without updating the second broadcast area related to the MBMS bearer.

* * * * *